United States Patent
Frank

(10) Patent No.: US 6,932,398 B2
(45) Date of Patent: Aug. 23, 2005

(54) BUMPER HAVING A HOLLOW SECTION AND MOUNTING BRACKETS ATTACHED TO IT

(75) Inventor: Simon Frank, Tengen (DE)

(73) Assignee: Alcan Technology & Management Ltd. (CH)

( * ) Notice: Subject to any disclaimer, the term of this patent is extended or adjusted under 35 U.S.C. 154(b) by 281 days.

(21) Appl. No.: 10/384,468

(22) Filed: Mar. 6, 2003

(65) Prior Publication Data

US 2004/0232711 A1 Nov. 25, 2004

(30) Foreign Application Priority Data

Mar. 6, 2002 (DE) .......................................... 102 09 721

(51) Int. Cl.[7] .............................................. B60R 19/24
(52) U.S. Cl. .................... 293/155; 293/132; 296/187.03
(58) Field of Search ................................ 293/122, 132, 293/133, 155; 296/187.03, 187.09

(56) References Cited

U.S. PATENT DOCUMENTS

| | | | |
|---|---|---|---|
| 1,680,928 A | * 8/1928 | Yanss | ......................... 293/155 |
| 4,563,028 A | 1/1986 | Ogawa et al. | |
| 5,080,410 A | 1/1992 | Stewart et al. | |
| 5,114,198 A | * 5/1992 | Yamashita et al. | .......... 293/120 |
| 5,584,518 A | 12/1996 | Frank et al. | |
| 6,371,541 B1 | * 4/2002 | Pedersen | ..................... 293/132 |
| 2002/0113447 A1 | * 8/2002 | Frank | .......................... 293/133 |
| 2004/0207217 A1 | * 10/2004 | Muller et al. | ................ 293/133 |

FOREIGN PATENT DOCUMENTS

| | | |
|---|---|---|
| DE | 198 31 708 | 1/2000 |
| DE | 298 23 973 | 4/2000 |
| EP | 0 110 631 | 6/1984 |
| EP | 71 81 58 | 6/1996 |
| EP | 894 675 | 2/1999 |
| EP | 0 908 356 | 4/1999 |

* cited by examiner

*Primary Examiner*—Patricia L. Engle
(74) *Attorney, Agent, or Firm*—Ostrolenk, Faber, Gerb & Soffen, LLP; Klaus P. Stoffel

(57) ABSTRACT

A bumper having a hollow section and attached to it mounting brackets for attaching the bumper to a vehicle—in particular on longitudinal beams of a private car—is such that section walls that are spaced apart form a compression strut and a tensile strut and a pair of flanking walls joining the said struts make up the hollow section. The bracket itself is a hollow section which exhibits a length of hollow-section beam facing the longitudinal beam and a curved length which is bent out from its longitudinal axis and is for connection to the hollow section of the bumper. In addition, the hollow section of the bracket contains two side walls which are joined by transverse walls and, in the region of the curved length, one of the side walls is brought up against the other side wall forming a channel-shaped cross-section

13 Claims, 2 Drawing Sheets

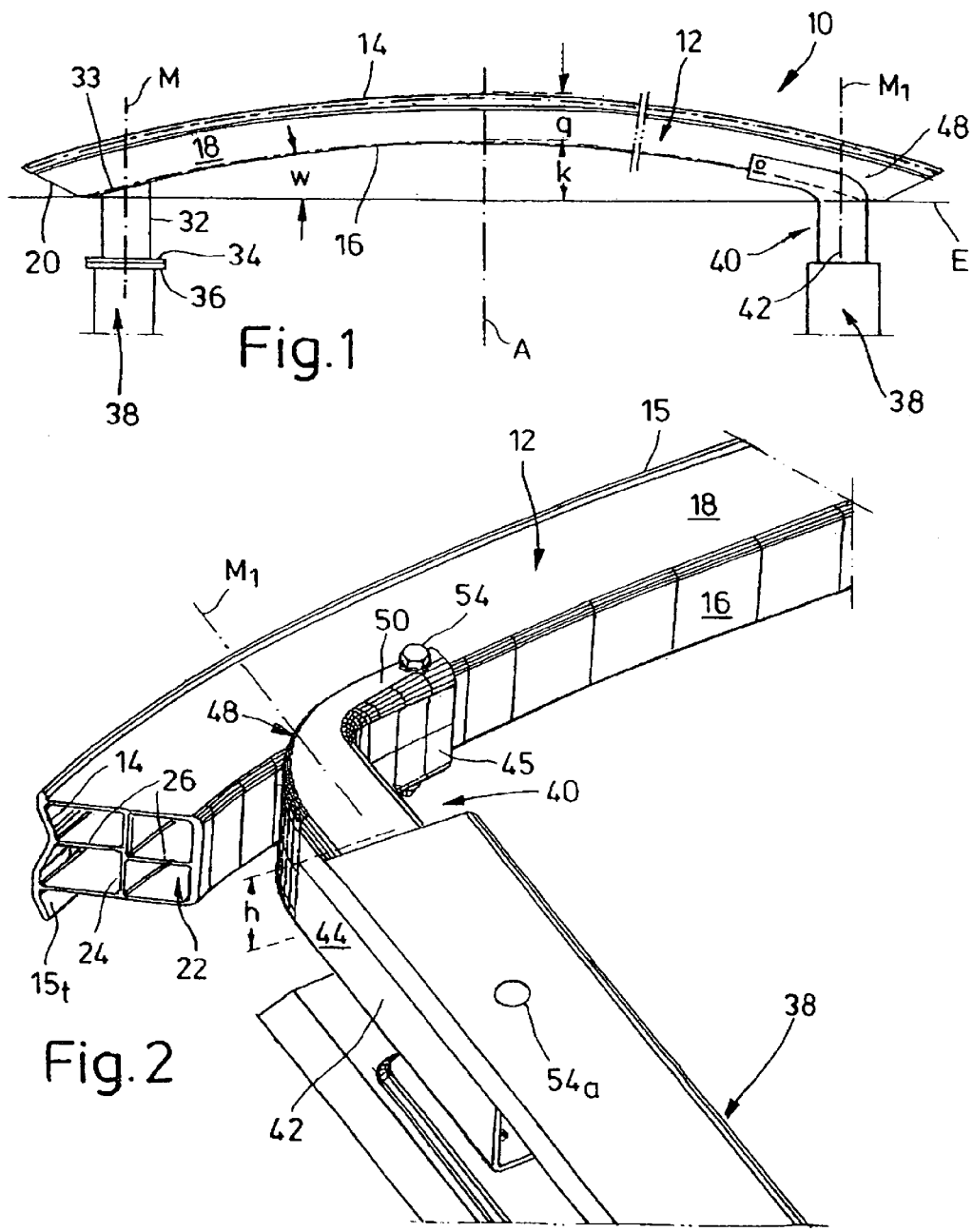

BUMPER HAVING A HOLLOW SECTION AND MOUNTING BRACKETS ATTACHED TO IT

BACKGROUND OF THE INVENTION

The present invention relates to a bumper having a hollow section and attached to it mounting brackets for attaching the bumper to a vehicle—in particular on longitudinal beams of a private car. Section walls that are spaced apart form a compression strut and a tensile strut and a pair of flanking walls joining the said struts make up the hollow section and the hollow section, if desired, is domed at least in the region of the mounting bracket with respect to a transverse plane of the longitudinal axis of the vehicle.

A bumper of this kind with plate-shaped brackets traversing the longitudinal axis of its longitudinal beams is described in EP 0 718 158 B1, whereby attention is drawn to the fact that—apart from the cross-sectional shape of the bumper—also the shape of the connection to the vehicle longitudinal beam influences its stability of shape and its capacity to compensate for energy taken up under collision conditions.

Many types of bracket for attaching the bumper to the vehicle are known—e.g. from documents U.S. Pat. No. 5,080,410 or U.S. Pat. No. 4,563,028; these, however, hardly contribute to improving the shape stability of a bumper under collision conditions.

SUMMARY OF THE INVENTION

Accordingly, it is an object of the present invention to provide a bumper with mounting brackets of the kind described above which at low weight exhibits a high degree of shape stability along with adequate capacity to compensate for deformation energy arising on impact. Further, the manufacture and handling of the bumper and the mounting bracket should be very simple and the longitudinal beam forces lower and central.

In accordance with the invention the mounting bracket is in the form of a hollow section which exhibits a length of hollow-section beam at the end facing the longitudinal beam and a curved length bent out of its longitudinal axis for connection to the hollow section of the bumper. In that respect it has been found favorable for the hollow section of the bracket to exhibit two side walls joined by transverse walls and for one of the side walls, in the region of the curved length, to be brought up to the other side wall forming a channel-shaped cross-section. The cross-section is double layered as it is preferably made up of the overlying side walls and the transverse walls which are folded in about the middle As a result of this design of bracket, a connection between the slightly bent hollow section of the bumper and the longitudinal beam of the vehicle which decisively satisfies the set objective is achieved. In this connection it should be pointed out that the bracket according to the invention allows a bumper to be attached to a longitudinal beam in a favorable manner, even if that is in the form of another element than a hollow section.

According to another feature of the invention, when the bracket is installed in place, the overlying side walls of the curved length lie snugly against the neighboring section wall of the bumper, whereby the folded transverse walls of the curved length which represent the flanges of the channel-shaped length partially overlap the flanking walls of the hollow section—or a corresponding component—of the bumper.

The folded transverse walls or the flanges of the channel-shaped cross-section of the curved length are, according to the invention, connected to the flanking walls of the hollow section of the bumper lying between them, the transverse walls of the length of hollow-section beam to the longitudinal beam of the vehicle. It has been found that a releasable connection—for example a bolted connection between the bracket and the hollow section of the bumper or the longitudinal beam of the vehicle—is particularly advantageous for mounting and exchange purposes.

In addition to cost reduction, the means according to the invention for connecting of the bumper or the hollow section to the longitudinal beams of the vehicle enables many advantages to be achieved, some of which are as follows:

a) low weight (2 to 3 kg);

b) ductile behaviour;

c) low degree of penetration on reduction of energy in the pre-chamber;

d) Al-alloy without copper or zinc;

e) reduction of energy in the section, and f) less or central longitudinal beam forces and, as a result, lighter inherent construction.

BRIEF DESCRIPTION OF THE DRAWINGS

Further advantages, features and details of the invention are revealed in the following description of preferred exemplified embodiments and with the aid of the drawing which shows in FIG. 1: plan view of a bumper with mounting brackets—which are different in shape at both ends of the bumper—for attaching it to a longitudinal beam;

FIG. 2: a perspective view of part of a bumper with a mounting bracket according to the invention;

DETAILED DESCRIPTION OF THE PREFERRED EMBODIMENTS

Figure 3:
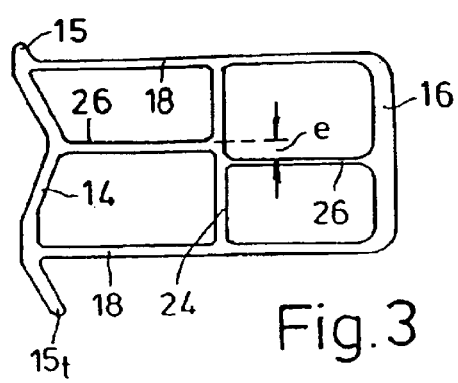
FIG. 3: an end view of the bumper shown in FIG. 2.

An extruded aluminium alloy bumper 10 of a private car—not shown here for reasons of clarity—exhibits, as shown in FIG. 1, two section walls 14, 16 which are spaced a distance a apart and are complemented by flanking walls 18 to make up a box-shaped hollow section 12. The hollow section 12 is arranged on a transverse plane E running perpendicular to the longitudinal axis A of the vehicle and is uniformly curved on both sides of the vehicle axis A which here forms a plane of symmetry to that transverse plane E. The hollow section 12 defines a degree of curvature k to the transverse plane E in the longitudinal axis A. When installed, the section wall 14 facing away from the transverse plane E forms an outer or compressive strut which takes on the forces of impact, the other section wall 16 is an inner or tensile strut.

Close to the end faces 20 of the hollow section 12 are—as shown in FIG. 1—deformation facilities made up of a section length 32 and an attachment flange 34 which is attached on the section length 32 at one end and traverses the middle line M of the section length 32. The deformation facilities are mounted on the inner section wall 16 and, at the other end, welded to the attachment flange 34 in each case on a counter-flange 36 of the longitudinal beams 38 of the vehicle. The section length 32 is likewise made of an extruded section, and the attachment flange 34 is also made of an aluminium alloy. Further, the section length 32 is tapered at the end facing the bumper 10 and this tapered edge 33 makes an angle w for example of 10° with the transverse plane E.

Figure 4:
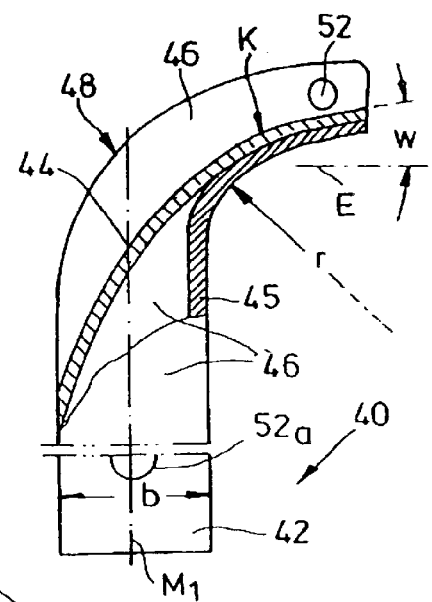
FIG. 4: a partially sectioned plan view of a foot-shaped bracket as a mounting bracket for the bumper shown in FIG. 2.
Figure 5:
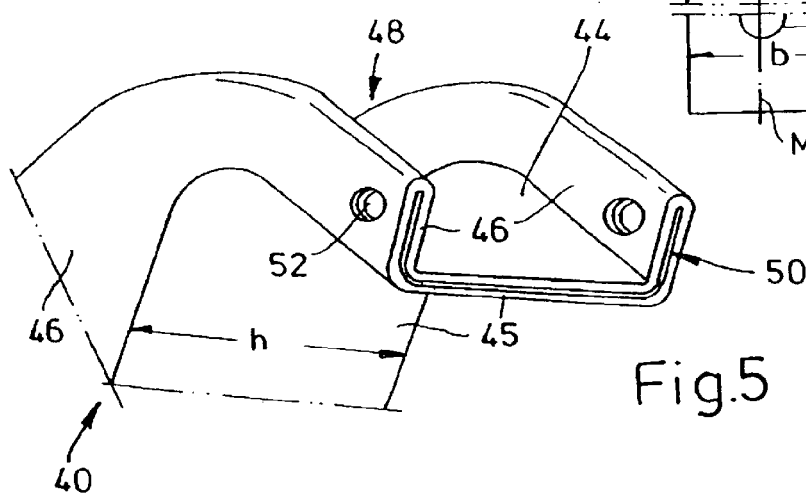
FIG. 5: a perspective view of part of the foot-shaped bracket.

The connection of the hollow section 12 to the longitudinal beam 38 of the vehicle is shown in FIGS. 2–4. From FIGS. 2 and 3 it is clear that section wall 14 which acts as the outer strut is curved in a wave-like manner and features wing-like wall lengths 15, 15$_t$ which extend beyond the flanking walls 18. In the section interior 22, a transverse wall 24 with a middle wall 26 on either side running between it and the section walls 14, 16 is provided in one piece along with the section walls 14, 16 and the walls 18 flanking these. These middle walls 26 are displaced sideways with respect to each other by a distance e.

The connection of the hollow section 12 to the longitudinal beams 38 is made here by means of a bracket 40 of extruded, aluminium alloy, hollow section of breadth b of e.g. 55 mm and height h of 75 mm.

In the case of a specially manufactured length of hollow-section beam 42 directed towards the longitudinal beam 38 of the vehicle and bolted to it, the length of beam 42 is approximately rectangular in cross-section, comprises two parallel side walls 44, 45 and transverse walls 46 joining these and exhibits a further, curved length 48. The right hand side wall 45 in FIGS. 2, 4 is curved outwards with a radius r, i.e. here curved to the right from the longitudinal axis M$_1$ of the length of hollow-section beam 42, and the other side wall 44 shaped towards the end such that both side walls 44, 45 lie on top of each other and both of the transverse walls 46 are folded in the middle. Thereby, the inner curve k runs in the same manner as the outer face of the inner section wall 16 of the hollow section 12; i.e. it forms the above mentioned angle w with a plane E$_1$ parallel to the transverse plane E.

In the region of openings 52, the double layered flanges 50 of the resultant channel-shaped curved length 48 are penetrated by bolts 54 or the like connecting means which engage in the bumper 10 or hollow section 12. Corresponding openings 52$_a$ for connecting means 54$_a$ are provided at the other end of the length of hollow-section beam 42.

Figure 6:
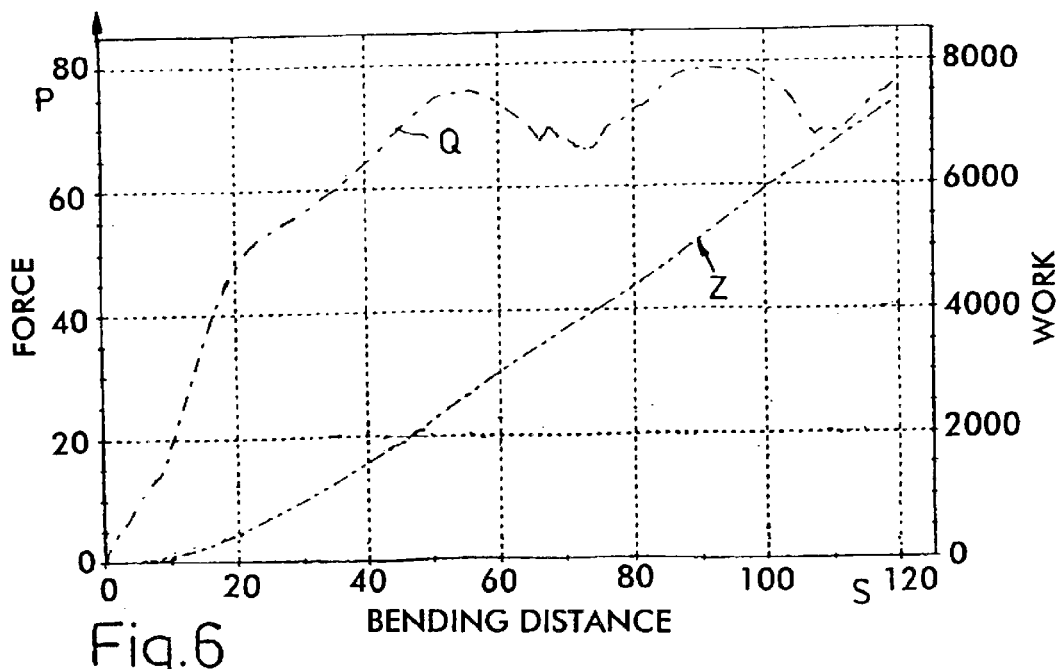
FIG. 6: a force-distance diagram of loading trials showing an energy curve.

The force-distance diagram shown in FIG. 6 illustrates the compressive force P (kN) as a function of the distance of bending S (mm) as a result of a loading test carried out on the bumper arrangement according to the invention. The initial, relatively steep, rise exhibited by curve Q indicates an excellent capacity for compensating for the incoming energy of deformation. Shown on the right of the diagram the work, in Joules, for an energy curve Z.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A bumper comprising: a hollow section having section walls that are spaced apart and form a compression strut and a tensile strut, and a pair of flanking walls that join the struts to form the hollow section; and a mounting bracket attached to the hollow section for attaching the bumper to a longitudinal beam of a vehicle, the bracket being a hollow section having a length of hollow-section beam facing the longitudinal beam and a curved length which is bent out from a longitudinal axis of the hollow section beam and is connected to the hollow section of the bumper, the hollow section of the bracket having two side walls connected by transverse walls and, in a region of the curved length, one of the side walls being brought up against the other side wall to form a channel-shaped cross-section.

2. A bumper according to claim 1, wherein the bumper hollow section is curved in a region of the mounting bracket with respect to a transverse plane of a longitudinal axis of the vehicle.

3. A bumper according to claim 1, wherein the channel-shaped cross-section of the bracket is made up of the overlying side walls and the transverse walls which are folded substantially in half to form flanges of the channel-shaped cross-section.

4. A bumper according to claim 3, wherein the side walls of the curved length lie flush against a neighboring section wall of the bumper and the folded transverse walls extend partially over the flanking walls of the hollow section of the bumper.

5. A bumper according to claim 3, wherein the folded transverse walls of the curved length are connected to the flanking walls of the hollow section of the bumper lying between them.

6. A bumper according to claim 3, wherein flanges of the channel-shaped length of the curved length are connected to the flanking walls of the hollow section of the bumper lying between them.

7. A bumper according to claim 1, wherein the transverse walls of the length of hollow-section beam are connected to the longitudinal beam of the vehicle.

8. A bumper according to claim 5, and further comprising means for a releasably connecting the bracket to the hollow section of the bumper.

9. A bumper according to claim 8, wherein the means for releasably connecting includes a bolt arranged to connect the bracket to the hollow section of the bumper.

10. A bumper according to claim 5, and further comprising means for releasably connecting the bracket to the longitudinal beam of the vehicle.

11. A bumper according to claim 10, wherein the means for releasably connecting includes a bolt arranged to connect the bracket to the longitudinal beam.

12. A bumper according to claim 1, wherein at least one of the hollow beam of the bracket and the hollow section of the bumper is made of an extruded aluminium alloy free of at least one of copper Cu and zinc Zn.

13. A bumper mounting bracket, comprising a hollow-section beam having a curved length bent out from a longitudinal axis of the hollow-section beam and is connected to a hollow section of a bumper the hollow section of the bracket having two side walls connected by transverse walls and, in a region of the curved length, one of the side walls being brought up against the other side wall to form a channel-shaped cross-section.

* * * * *